(12) United States Patent
Romeu Guardia

(10) Patent No.: US 7,631,614 B2
(45) Date of Patent: Dec. 15, 2009

(54) FEEDER FOR ANIMALS

(75) Inventor: Gener Romeu Guardia, Agramunt (ES)

(73) Assignee: Rotecna S.A., Agramunt (ES)

( * ) Notice: Subject to any disclaimer, the term of this patent is extended or adjusted under 35 U.S.C. 154(b) by 122 days.

(21) Appl. No.: 11/878,701

(22) Filed: Jul. 26, 2007

(65) Prior Publication Data

US 2008/0029036 A1 Feb. 7, 2008

(30) Foreign Application Priority Data

Aug. 3, 2006 (ES) ................................. 200602112

(51) Int. Cl.
*A01K 5/04* (2006.01)
(52) U.S. Cl. ...................................................... 119/54
(58) Field of Classification Search .................. 119/54, 119/52.1, 56.1, 57.5, 57.91
See application file for complete search history.

(56) References Cited

U.S. PATENT DOCUMENTS 2,773,474 A * 12/1956 Dodds .......................... 119/55
3,730,142 A * 5/1973 Kahrs et al. .................... 119/54
4,377,130 A * 3/1983 Schwieger ................. 119/51.5
4,945,859 A * 8/1990 Churchwell ............. 119/57.91
5,113,795 A * 5/1992 Delzio ...................... 119/51.01
5,123,379 A * 6/1992 von Taschitzki ........... 119/53.5
RE35,173 E * 3/1996 Delzio ...................... 119/51.01
5,595,139 A * 1/1997 Hofer et al. .................... 119/54
5,839,389 A 11/1998 Fujii
6,116,471 A * 9/2000 Miller ......................... 222/199
7,028,635 B1 * 4/2006 Eastman, II .............. 119/51.11

* cited by examiner

*Primary Examiner*—Yvonne R. Abbott
(74) *Attorney, Agent, or Firm*—Sughrue Mion, PLLC

(57) ABSTRACT

A feeder for animals which includes a feed storage tank equipped with at least one chute at its base, through which the feed falls due to the force of gravity. The feeder also includes a distribution tray arranged beneath the chute of the tank to collect the feed coming from the feed storage tank. The feeder further includes a supporting body for supporting the distribution tray, an operating lever for moving the distribution tray and an articulated joint for joining the operating lever to the supporting body. The operating lever is arranged beneath the distribution tray, where the operating lever may be easily moved by an animal.

16 Claims, 2 Drawing Sheets

FEEDER FOR ANIMALS

TECHNICAL FIELD OF THE INVENTION

The invention relates to a feeder for animals of the type which comprises a feed storage tank equipped with a chute at its base, through which the feed falls due to the force of gravity, and a corresponding distribution tray arranged beneath the chute of the tank, whereon the feed coming from said tank collects, said distribution tray being movably attached to the feeder with regard to the chute of the tank in order to cause the falling onto the same of the feed collected above it when briskly moved from its position by an animal.

BACKGROUND OF THE INVENTION

Document U.S. Pat. No. 5,839,389 discloses feeders which discharge similar quantities of feed whenever a component of the feeder is operated by an animal.

The feeder disclosed in document U.S. Pat. No. 5,839,389 comprises in a known way a feed storage tank equipped with a mouth outlet in its base through which the feed passes due to the force of gravity. Said feeder is equipped with a distribution tray arranged beneath the mouth of the storage tank, which is permanently open, and whereon the feed coming from said tank collects.

The distribution tray is affixed at the lower end of a suspending rod which passes vertically through the interior of the storage tank, in such a way that the aforementioned distribution tray is in turn suspended, being capable of a swinging movement when pushed laterally by an animal. When this happens, it causes the falling of the feed which has collected on the distribution tray, and at the same time more feed is discharged from the storage tank; said feed tends to occupy the space left free on the distribution tray by the feed displaced.

The feeder disclosed allows the regulation of the distance separating the distribution tray and the mouth of the storage tank with relative ease, by varying the suspended height of the distribution tray. The greater the separating distance, the greater the quantity of feed which falls from the storage tank and which collects on the distribution tray and therefore, the greater the quantity of feed which is poured from the distribution tray when an animal moves it briskly from its position.

However, the feeder disclosed in U.S. Pat. No. 5,839,389 presents a number of drawbacks. Firstly, in those situations in which the storage tank holds large quantities of feed, and said feed reaches a certain height inside the storage tank, the movement of the suspending rod, which extends through the interior of the storage tank, is hindered by the feed contained, and is blocked with a certain amount of pressure in the area next to the outlet mouth of the storage tank. In consequence, when an animal pushes the distribution tray, said tray swings with difficulty. This obstruction of the movement may also impede the tray from returning to its original position after being pushed by an animal, giving rise to an irregular operation of the feeder on being pushed once again by an animal.

In order to prevent this drawback, the upper surface of the distribution tray features a truncated conical body, whose purpose is to distribute evenly over the distribution tray the feed which falls from the storage tank and to oblige the tray to return to its original position.

An objective of this invention is to disclose an alternative solution to conventional feeders and in particular, to feeders such as that disclosed in U.S. Pat. No. 5,839,389, being constructively simple and whose operation is not hindered when a large quantity of feed is held in the storage tank.

EXPLANATION OF THE INVENTION

The animal feeder which is the object of this invention comprises a feed storage tank equipped with at least one chute at its base, through which the feed falls due to the force of gravity, and a corresponding distribution tray arranged beneath the chute of the tank, whereon the feed coming from said tank collects, said distribution tray being movably attached to the feeder with regard to the chute of the tank in order to cause the falling of the feed collected on the same when it is briskly moved from its position.

Essentially, the feeder is characterised in that it is equipped with a distribution tray supporting body, with a distribution tray operating lever arranged below said tray which may be easily operated by an animal, and with an articulated joining means between the operating lever and the aforementioned supporting body.

In accordance with another characteristic of the invention, the articulated joint between the operating lever and the distribution tray supporting body is located above the centre of gravity of the operating lever; due to this, said lever adopts, due to the force of gravity, a position of equilibrium when it is not pushed by an animal, automatically returning to the aforementioned position of equilibrium after having been moved away from the same.

Alternatively, the articulated joining means between the operating lever and the supporting body is equipped with a return means in order that the aforementioned operating lever automatically adopts a position of equilibrium when it is not pushed by an animal, automatically returning to the aforementioned position of equilibrium after having been moved away from the same.

In accordance with another characteristic of the invention, the distribution tray is equipped with a through-hole which is traversed by the upper end of the operating lever and, preferably, the through-hole will be made at the central zone of the distribution tray.

In an alternative variant, the lower surface of the distribution tray features a tubular body, open at its base, similar to an upturned bucket, into which the upper end of the operating lever is inserted and affixed.

In accordance with another characteristic of the feeder, the supporting body is equipped with two walls facing each other, arranged with a separation between them of approximately the width of the distribution tray, and equipped with a supporting means for the lateral edges of the distribution tray, which rests on the aforementioned supporting means, preferably in a horizontal position.

In accordance with another characteristic of the invention, the articulated joining means comprise a shaft joined to the opposing walls of the supporting body and whereto the operating lever is attached, it being possible for the latter to turn around the longitudinal axis of the aforementioned shaft.

In a preferred embodiment, the feeder also comprises a means for the regulation of the distance separating the distribution tray from the chute at the base of the storage tank.

BRIEF DESCRIPTION OF THE DRAWINGS

In the attached drawings, as a non-limitative example, two variants of a feeder in accordance with the invention are portrayed. Specifically.

DETAILED DESCRIPTION OF THE DRAWINGS

Figure 1:
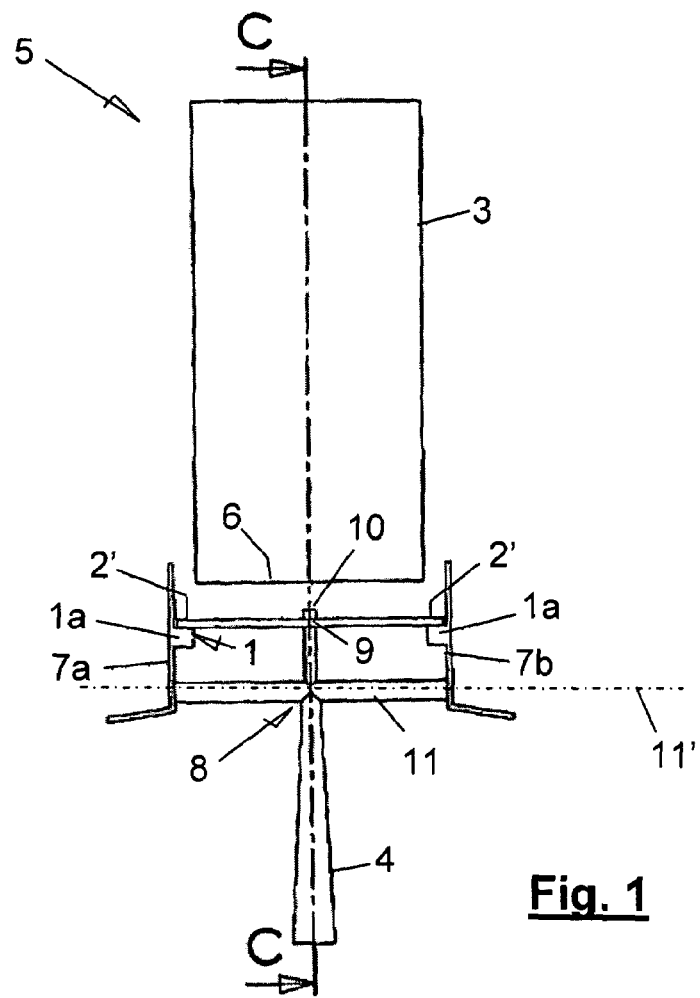
In FIG. 1 a front elevational view of the first variant of the feeder is portrayed.

The feeder 5 portrayed in FIG. 1 comprises a feed storage tank 3 equipped with a chute 6 at its base, through which the feed falls due to the force of gravity, and a corresponding distribution tray 2, arranged at a certain distance beneath the chute 6 at the base of the aforementioned tank 3, whereon the feed coming from the storage tank 3 collects.

As may be seen in the aforementioned FIG. 1, the feeder 5 is equipped with a supporting body 7 for the distribution tray 2. This supporting body 7 features two opposing walls 7a and 7b, the separation between the two being approximately equal to the width of the distribution tray 2, equipped with a supporting means 1 for the distribution tray 2. In the example in FIG. 1, the supporting means 1 is comprised of a pair of transversal projections 1a, projecting a short distance, arranged on the opposing walls 7a and 7b of the supporting body 7, at the same height and facing each other, whereon the opposing lateral edges 2' of the distribution tray 2 rest; said tray thus rests horizontally and in a stable manner.

The distribution tray 2 is designed to be moved to one side by an animal, in such a way that its movement will bring about the falling of the feed which has collected on the same. To this end, the distribution tray 2 of the feeder 5 is equipped with an operating lever 4 which is positioned beneath said distribution tray 2, a sufficient length of said lever projecting below the tray for it to be operated without difficulty by an animal.

The operating lever 4 is articulately joined to the supporting body 7 by means of an articulated joining means 8, described in detail below, and is joined at its upper end to the distribution tray 2. In the example in FIG. 1, the distribution tray 2 features a through-hole 9 which is traversed by the upper end 10 of the operating lever 4: by this means the swinging of the operating lever 4 is transmitted to the distribution tray 2, bringing about its horizontal movement along the supporting means 1. As may be seen in FIG. 1, the through-hole 9 is made in the central zone of the distribution tray 2 in order to facilitate the dragging of the distribution tray on swinging the operating lever 4.

The articulated joining means 8 between the operating lever 4 and the supporting body 7 is comprised of a shaft 11, joined horizontally, and being able to turn on its longitudinal axis 11', to the opposing walls 7a and 7b of the supporting body 7, whereto the operating lever 4 is firmly attached; said lever may turn on the longitudinal axis 11' of the shaft 11.

Figure 2A:
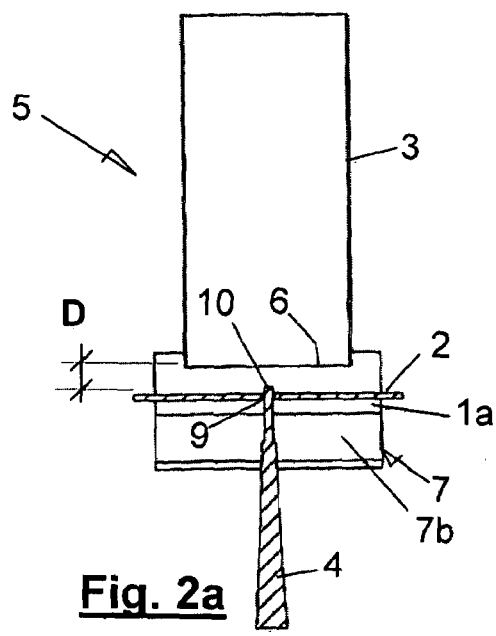
in FIGS. 2a and 2b a sectional side elevational view of the feeder in FIG. 1 is portrayed, in accordance with the mirror plane CC marked in FIG. 1, and in accordance with two positions of the operating lever and therefore of the distribution tray.
Figure 2B:
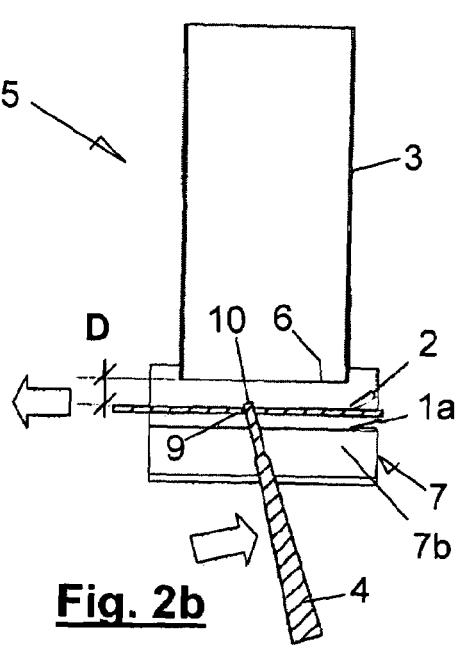

In FIGS. 2a and 2b, the feeder 5 in FIG. 1 is portrayed in section, in accordance with a mirror plane. In said figures, the distribution tray 2 adopts two different positions. It may be seen that in FIG. 2a the operating lever 4 adopts a vertical position while in FIG. 2b the operating lever has been moved from the original position portrayed in FIG. 2a, causing the movement of its upper end 10 and therefore the horizontal movement of the distribution tray 2, in the direction indicated by the arrow in FIG. 2b.

Figure 4:
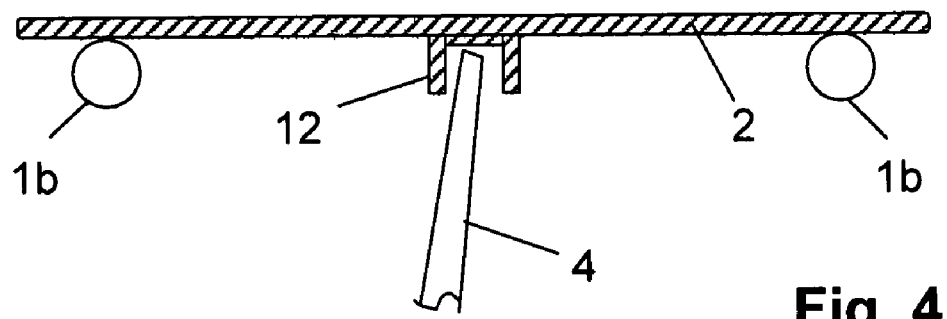

In accordance with another variant portrayed in FIG. 4, instead of featuring a through-hole 9, the distribution tray 2 is equipped, on its lower surface, with a tubular body 12 open at its base, similar to an inverted bucket, into which the upper end 10 of the operating lever 4 is inserted and affixed. Preferably, as in the variant in which the distribution tray 2 features the through-hole 9, the aforementioned hollow component is also located in the central zone of the distribution tray 2.

In order that the operating lever 4 may return automatically to the position portrayed in FIG. 2a, the centre of gravity of the operating lever 4 is located below its articulated joint with the supporting body 7, that is to say, below its joint to the shaft 11. In this way, the operating lever 4 automatically adopts, due to the force of gravity, the position of equilibrium portrayed in FIG. 2a when it is not pushed by an animal, automatically returning to the aforementioned position of equilibrium after having been moved away from the same. It may be seen in FIGS. 1, 2a and 2b that the thickness of the operating lever 4 increases as it nears its lower end; this is precisely to favour the effect described and to facilitate the automatic return of the operating lever 4 to its position of equilibrium, adopting a position in which access to said operating lever poses no difficulties to an animal.

Although it is not portrayed, it is foreseen that the automatic return of the operating lever 4 from a position in which the distribution tray 2 has been moved, as portrayed in FIG. 2b, to its position of equilibrium when the animal ceases to push the operating lever 4, may be caused by the push or pull of an elastic means, provided on the articulation means 8 to this effect.

Figure 3:
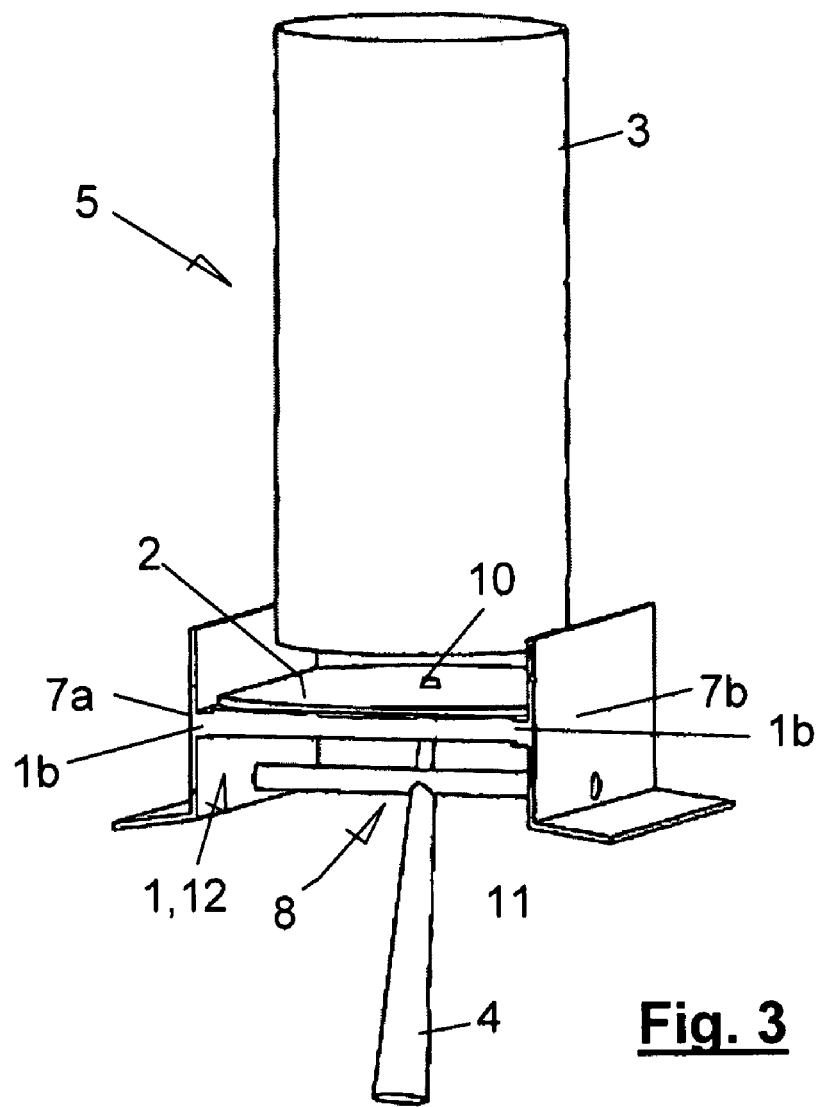
in FIG. 3 a view in perspective of a second variant of the feeder in accordance with the invention is portrayed; and in FIG. 4 the distribution tray is portrayed resting on the supporting means and connected to the operating lever, in accordance with a third variant of the invention.

The feeder 5 portrayed in perspective in FIG. 3 is comprised of the same elements as the feeder 5 in FIG. 1, with the difference that the variant portrayed in this FIG. 3 features supporting means 1b which are different from those of the feeder 5 in accordance with the variant in FIG. 1.

Specifically, the supporting means 1b of the feeder 5 in FIG. 3 is comprised of a pair of parallel bars, one at the front and another at the rear (of which only the front bar is visible in FIG. 3) which stretch from one wall 7a of the supporting body 7 to the opposite wall 7b of the same supporting body 7. The ends of said bars are firmly attached to the aforementioned walls 7a and 7b; due to this, they withstand with ease the weight of the distribution tray 2 and of the feed which has collected on the same, and they are arranged sufficiently apart to provide a stable support for the distribution tray 2 when the operating lever 4 is in its position of equilibrium, and the distribution tray is centred regarding the chute 6 of the storage tank 3, and also when the operating lever 4 is moved by an animal, the distribution tray 2 being moved in turn. The upper end 10 of the operating lever 4 is arranged between the two bars which constitute the supporting means 1b.

The possibility has been considered that the bars which comprise the aforementioned supporting means 1b may be quadrangular or circular in section, this latter variant being that which offers less resistance to the sliding of the distribution tray 2 which rests on said bars. The portrayal in FIG. 4 is that of the distribution tray 2, in cross-section, of a feeder in accordance with a third variant in which said distribution tray is resting on two bars, which comprise the supporting means 1b and are circular in section, and in which the connection between the distribution tray 2 and the operating lever 4 is carried out by means of the insertion of the upper end 10 of said operating lever into the tubular body 12 featured on the lower side of the distribution tray 2.

Regarding the means of regulating the separating distance D between the distribution tray 2 and the chute 6 at the base of the storage tank 3, this comprises a known method of raising and lowering means of the supporting body 7 and/or the storage tank 3.

The invention claimed is:

1. A feeder for animals which comprises:
   a feed storage tank comprising at least one chute at a base of the feed storage tank, wherein feed falls through the at least one chute due to the force of gravity;
   a distribution tray arranged beneath the at least one chute, wherein the feed that falls from said feed storage tank collects on the distribution tray, said distribution tray being movably mounted on the feeder with regard to the at least one chute which allows the feed collected on said distribution tray to fall when the distribution tray is briskly moved;
   a supporting body for supporting the distribution tray; and
   an operating lever arranged beneath said distribution tray which may be moved by an animal to move the distribution tray, wherein the operating lever is connected to the supporting body by an articulated joint;
   wherein the distribution tray comprises an open tubular body extending downward from a lower surface of the distribution tray, wherein an upper end of the operating lever is inserted in and affixed to the open tubular body of the distribution tray.

2. The feeder according to claim 1, wherein the articulated joint between the operating lever and the supporting body is located above the center of gravity of the operating lever, so that, due to the effect of the force of gravity, said lever remains in a position of equilibrium when the operating lever is not pushed by an animal, and wherein the operating lever automatically returns to said position of equilibrium after being moved away from the position of equilibrium.

3. The feeder according to claim 1, wherein the articulated joint between the operating lever and the supporting body is equipped with means for maintaining operating lever in a position of equilibrium when the operating lever is not pushed by an animal, and automatically returning the operating lever to the position of equilibrium after being moved away from the position of equilibrium.

4. The feeder according to claim 1, further comprising means for regulating the separating distance between the distribution tray and the chute at the base of the storage tank.

5. A feeder for animals which comprises:
   a feed storage tank comprising at least one chute at a base of the feed storage tank, wherein feed falls through the at least one chute due to the force of gravity;
   a distribution tray arranged beneath the at least one chute, wherein the feed that falls from said feed storage tank collects on the distribution tray, said distribution tray being movably mounted on the feeder with regard to the at least one chute which allows the feed collected on said distribution tray to fall when the distribution tray is briskly moved;
   a supporting body for supporting the distribution tray; and
   an operating lever arranged beneath said distribution tray which may be moved by an animal to move the distribution tray, wherein the operating lever is connected to the supporting body by an articulated joint;
   wherein the supporting body comprises two opposing walls, arranged with a separation between them of approximately the width of the distribution tray, and supporting means for supporting the distribution tray), wherein the distribution tray rests on the supporting means.

6. The feeder according to claim 5, wherein the articulated joint between the operating lever and the supporting body is located above the center of gravity of the operating lever, so that, due to the effect of the force of gravity, said lever remains in a position of equilibrium when the operating lever is not pushed by an animal, and wherein the operating lever automatically returns to said position of equilibrium after being moved away from the position of equilibrium.

7. The feeder according to claim 5, wherein the articulated joint between the operating lever and the supporting body is equipped with means for maintaining the operating lever in a position of equilibrium when the operating lever is not pushed by an animal, and automatically returning the operating lever to the position of equilibrium after being moved away from the position of equilibrium.

8. The feeder according to claim 5, wherein the distribution tray comprises a through-hole which is traversed by the upper end of the operating lever.

9. The feeder according to claim 5, wherein the through-hole is made in a central zone of the distribution tray.

10. The feeder according to claim 5 further comprising means for regulating the separating distance between the distribution tray and the chute at the base of the storage tank.

11. A feeder for animals which comprises:
    a feed storage tank comprising at least one chute at a base of the feed storage tank, wherein feed falls through the at least one chute due to the force of gravity;
    a distribution tray arranged beneath the at least one chute, wherein the feed that falls from said feed storage tank collects on the distribution tray, said distribution tray being movably mounted on the feeder with regard to the at least one chute which allows the feed collected on said distribution tray to fall when the distribution tray is briskly moved;
    a supporting body for supporting the distribution tray; and
    an operating lever arranged beneath said distribution tray which may be moved by an animal to move the distribution tray, wherein the operating lever is connected to the supporting body by an articulated joint;
    wherein the articulated joint comprises a shaft joined to opposing walls of the supporting body;
    wherein the operating lever is joined to said shaft the operating lever being able to rotate about a longitudinal axis of the shaft.

12. The feeder according to claim 11, wherein the articulated joint between the operating lever and the supporting body is located above the center of gravity of the operating lever, so that, due to the effect of the force of gravity, said lever remains in a position of equilibrium when the operating lever is not pushed by an animal, and wherein the operating lever automatically returns to said position of equilibrium after being moved away from the position of equilibrium.

13. The feeder according to claim 11, wherein the articulated joint between the operating lever and the supporting body is equipped with means for maintaining the operating lever in a position of equilibrium when the operating lever not pushed by an animal, and automatically returning the operating lever to the position of equilibrium after being moved away from the position of equilibrium.

14. The feeder according to claim 11, wherein the distribution tray comprises a through-hole which is traversed by the upper end of the operating lever.

15. The feeder according to claim 11, wherein the through-hole is made in a central zone of the distribution tray.

16. The feeder according to claim 11 further comprising means for regulating the separating distance between the distribution tray and the chute at the base of the storage tank.

* * * * *